US008122064B2

(12) United States Patent
Asai et al.

(10) Patent No.: US 8,122,064 B2
(45) Date of Patent: Feb. 21, 2012

(54) COMPUTER PROGRAM, METHOD, AND APPARATUS FOR DATA SORTING

(75) Inventors: Tatsuya Asai, Kawasaki (JP); Seishi Okamoto, Kawasaki (JP); Hiroki Arimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 883 days.

(21) Appl. No.: 12/002,399

(22) Filed: Dec. 17, 2007

(65) Prior Publication Data
US 2008/0114765 A1 May 15, 2008

Related U.S. Application Data

(63) Continuation of application No. PCT/JP2006/312468, filed on Jun. 22, 2006.

(30) Foreign Application Priority Data

Jun. 30, 2005 (JP) .................................. 2005-192954

(51) Int. Cl.
*G06F 17/30* (2006.01)
(52) U.S. Cl. .................................. 707/803; 707/E17.05
(58) Field of Classification Search .................. 707/723, 707/748, 802–804, E17.05, 999.101
See application file for complete search history.

(56) References Cited

U.S. PATENT DOCUMENTS

| | | | |
|---|---|---|---|
| 5,490,269 A | 2/1996 | Cohn et al. | |
| 5,729,732 A | 3/1998 | Gal et al. | |
| 6,181,678 B1 | 1/2001 | Ha-Duong et al. | |
| 6,614,789 B1* | 9/2003 | Yazdani et al. | 370/392 |
| 2002/0116146 A1* | 8/2002 | Tomikawa et al. | 702/179 |
| 2003/0236793 A1* | 12/2003 | Karlsson | 707/101 |
| 2006/0020603 A1* | 1/2006 | Lo Turco et al. | 707/100 |
| 2007/0229323 A1* | 10/2007 | Plachta et al. | 341/51 |

FOREIGN PATENT DOCUMENTS

| | | |
|---|---|---|
| EP | 0 878 758 A1 | 11/1998 |
| JP | 05-265708 | 10/1993 |
| JP | 08-076975 | 3/1996 |
| JP | A 10-161991 | 6/1998 |
| JP | A 10-336216 | 12/1998 |
| JP | A 2003-044267 | 2/2003 |
| JP | A 2005-505079 | 2/2005 |
| WO | WO 03/032194 A1 | 4/2003 |

OTHER PUBLICATIONS

Stefan Nilsson, Radix Sorting and Searching, 1996, Department of Computer Science Lund University, ISBN 91-628-2089-3, p. 1-109.*
Thanaa M. Ghanem, Bulk Operations for Space-Partitioning Trees, Apr. 2004, Data Engineering, 2004. Proceedings. 20th International Conference.*

* cited by examiner

*Primary Examiner* — Thu-Nguyet Le
(74) *Attorney, Agent, or Firm* — Fujitsu Patent Center (57) ABSTRACT

A data sorting program that is capable of performing a data sorting process by using a small capacity of memory at a fast speed. A computer executing the data sorting program has the following functions. A concise ordered TRIE creator creates a root, sequentially reads the characters of each data, and when a prescribed number of data passed a certain node connected to the root before and a child node corresponding to a character next to a character associated with the certain node has not been created, creates the child node so that the child nodes of the certain node have a prescribed arrangement. A partition determination unit sets partitions between prescribed nodes. A data grouping unit groups the data into a plurality of data groups according to the partitions.

12 Claims, 12 Drawing Sheets

COMPUTER PROGRAM, METHOD, AND APPARATUS FOR DATA SORTING

CROSS-REFERENCE TO RELATED APPLICATIONS

This application is a continuing application, filed under 35 U.S.C. §111(a), of International Application PCT/JP2006/312468, filed Jun. 22, 2006, it being further noted that priority is based upon Japanese Patent Application No. 2005-192954, filed Jun. 30, 2005.

BACKGROUND OF THE INVENTION (1) Field of the Invention

This invention relates to a computer program, method, and apparatus for data sorting, and more particularly, to a computer program, method, and apparatus for sorting large sets of data.

(2) Description of the Related Art

A known data sorting method is that given data is rearranged in a predetermined order.

Conventional data sorting methods include quicksort, bubble sort, and shell sort. These data sorting methods require a computing time longer than linear time for processing data. Therefore, processing of a great number of data increases a computing time and severely deteriorates the computing performance of a computer, which is a problem.

To solve this problem, there is known a data sorting method using a tree structure (graph) that has a single root and does not have a closed loop (that is, an open-loop tree structure) (for example, refer to Japanese Unexamined Patent Publication No. 2003-44267).

One type of such tree structures is a TRIE structure that enables given data to be sorted within linear time (a time proportional to an amount of data).

Figure 12:
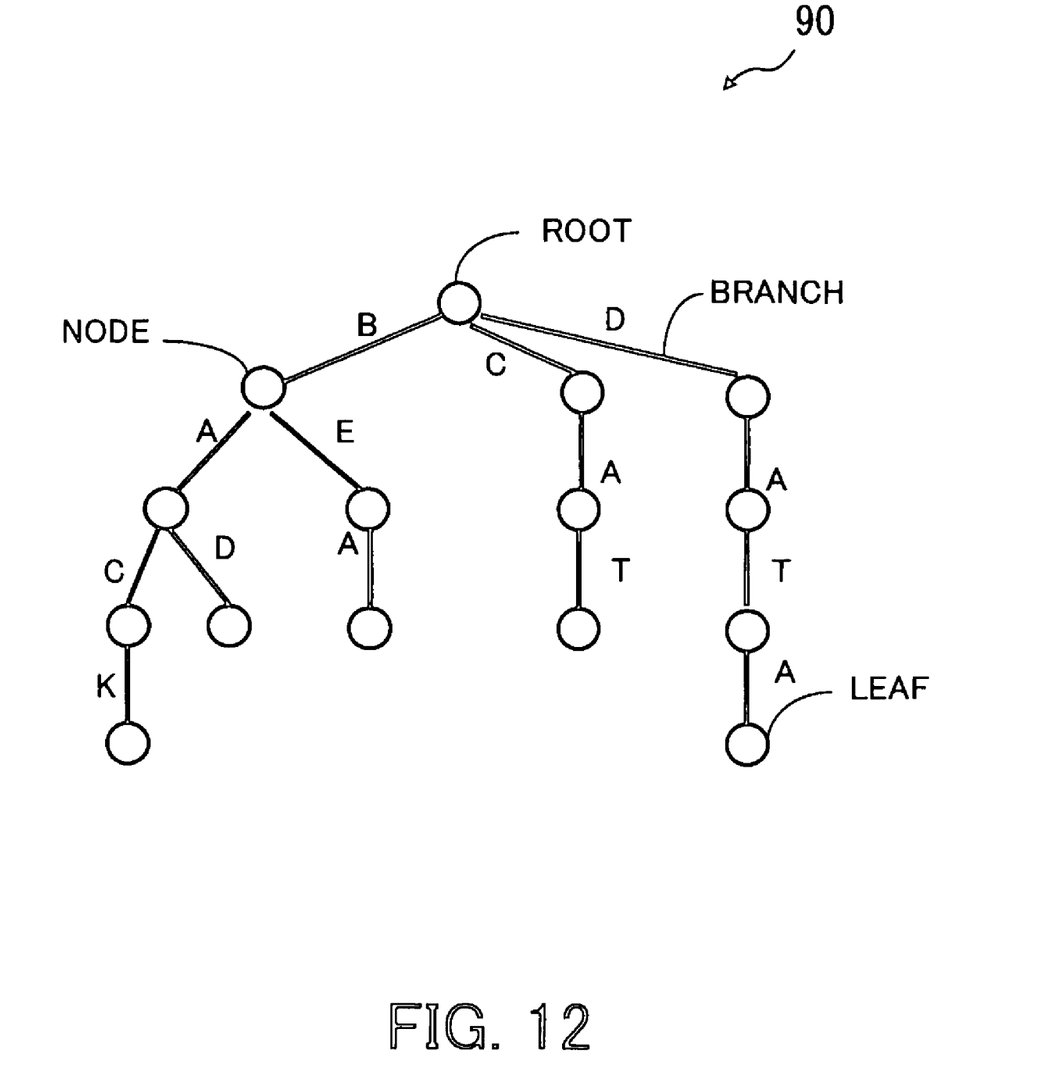
FIG. 12 shows character strings (data) having a plurality of characters in a TRIE structure.

FIG. 12 shows character strings (data) each having a plurality of characters in a TRIE structure.

In this connection, in FIG. 12, the vertical length and the horizontal length are called "depth" and "width", respectively.

A TRIE 90 has one or more nodes, and especially, the first node is called a "root". A line connecting a node and a node is called a "branch". In addition, in the case where a certain node is called a "parent node", a node at one lower level than the parent node is called a "child node". A node that has no child node is called a "leaf".

In order to look up characters, the TRIE 90 is walked down from the root. The root and nodes have as many branches as the kinds of characters represented in the TRIE 90, and the TRIE 90 is walked down by sequentially selecting branches corresponding to characters. In the TRIE 90, the root has three branches B, C, and D. For example, in the case of a character string "BACK", a branch B is first selected, and branches A and then C are selected, and finally, a branch K is selected, thus completing the look-up.

A data sorting method using such a TRIE structure, which is disclosed in Japanese Unexamined Patent Publication No. 2003-44267, does not severely deteriorate computing performance in processing a large amount of data (character strings).

However, the TRIE structure has a drawback that a computational domain (main memory capacity) proportional to an amount of different data (sort items) should be prepared (a large size of memory is consumed). Therefore, processing of a large number of character strings or long character strings causes a memory overflow, resulting in delaying a processing time.

That is to say, sorting or compiling of large sets of data having few overlapping data with such a TRIE structure causes a lack of computational domain, and severely deteriorates computing performance or ends in failure. This is a problem.

To solve this problem, there is known a method of grouping given data into a plurality of data groups and sorting the data of each group with an existing sorting method (for example, refer to Japanese Patent No. 2959497).

This method, however, has a problem that, since data is simply grouped, an order of data groups is not exactly determined, and therefore, another data process for combining the processed data groups should be performed. That is, the method does not realize efficient processing (that is, high processing cost).

SUMMARY OF THE INVENTION

This invention has been made in view of the foregoing and intends to provide a computer program, method, and apparatus for sorting data with a small capacity of memory at a high speed.

To accomplish the above object, there is provided a computer-readable recording medium having stored therein a data sorting program for sorting a data file having a plurality of data. The data storing program causes a computer to operate as: a concise ordered TRIE creator for creating a concise ordered TRIE by arranging the character strings of common prefixes appearing a prescribed number of times or more in the plurality of data, in a determined order; a partition determination unit for setting partitions between nodes; and a data grouping unit for grouping the data file into a plurality of data groups according to the partitions.

Further, to accomplish the above object, there is provided a data sorting method for sorting a data file having a plurality of data. The data storing method comprises the steps of: creating a concise ordered TRIE by arranging the character strings of common prefixes appearing a prescribed number of times or more in the plurality of data, in a determined order; setting partitions between nodes; and grouping the data file into a plurality of data groups according to the partitions.

Still further, to accomplish the above object, there is provided a data sorting apparatus for sorting a data file having a plurality of data. The data sorting apparatus comprises: a concise ordered TRIE creator for creating a concise ordered TRIE by arranging the character strings of common prefixes appearing a prescribed number of times or more in the plurality of data, in a determined order; a partition determination unit for setting partitions between nodes; and a data grouping unit for grouping the data file into a plurality of data groups according to the partitions.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

A preferred embodiment of the present invention will be described in detail with reference to the accompanying drawings.

First, the concept of the invention that is implemented in the embodiment will be described. Then the embodiment will be specifically described.

Figure 1:
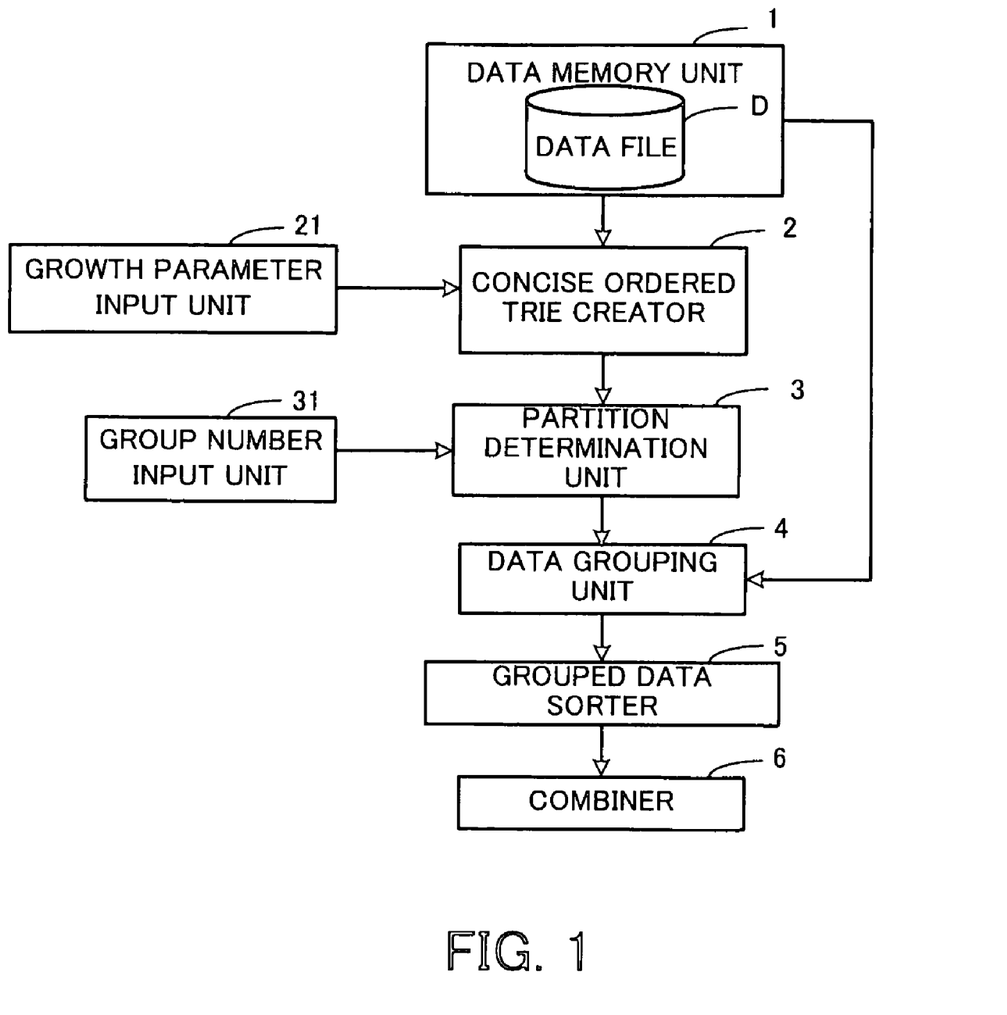
FIG. 1 is a conceptual view of the present invention that is implemented in one embodiment.

FIG. 1 is a conceptual view of the invention that is implemented in the embodiment.

A data memory unit 1 stores a data file D containing a plurality of data D1, . . . , and D(n).

When a concise ordered TRIE creator 2 receives the data file D from the data memory unit 1 and also receives a growth parameter from a growth parameter input unit 21, it creates a concise ordered TRIE.

The growth parameter will be described in detail later.

A "TRIE" is a tree structure that is created by arranging information on all inputted data D1, . . . , and D(n). A "concise ordered TRIE" is a partial tree structure of a TRIE, has the same root as the TRIE, and stores all prefixes of data (the character strings of common prefixes) that appear a prescribed number of times or more in the data D1, . . . , and D(n). In addition, speaking of alphabets, for example, child nodes of a certain parent node are clearly ordered from left to right in alphabetical order.

For example, consider a concise ordered TRIE for character strings (data) "BAD", "BACK", "BADY", . . . . The concise ordered TRIE is created in such a way that a node of character "B" is created, a node of character "A" that commonly appears a prescribed number of times (three times in this example) or more is created. Then, the node of character "A" following the node of character "B" is considered as a parent node, and if child nodes ("C" and "D" in this example) of this parent node appear a prescribed number of times or more when all of the data are arranged, the nodes of characters "C" and "D" are created in this order (ordered in a determined direction).

Such a concise ordered TRIE has a deep structure at portions where many data exist, and has a shallow structure at portions where little data exist. This means that the tree structure can be simplified without loosing information of important data portions.

A partition determination unit 3 determines partitions between nodes in the concise ordered TRIE. Specifically, the partition determination unit 3 determines the partitions of the concise ordered TRIE based on the number of data groups that is given from a group number input unit 31 and the number n of data such that the sizes of data groups, which will be described later, are as equal as possible.

A data grouping unit 4 puts the data D1, . . . , and D(n) into the created concise ordered TRIE according to the partitions determined by the partition determination unit 3, thereby grouping the data D1, . . . , and D(n) into as many data groups as the given number of data groups.

A grouped data sorter 5 sorts each data group with a prescribed sorting method.

A combiner 6 combines the data groups sorted by the grouped data sorter 5, in a determined order, thus creating sorted data.

As described above, when the data file D is input from the data memory unit 1 and the growth parameter is input from the growth parameter input unit 21, the concise ordered TRIE creator 2 creates the concise ordered TRIE. Then the concise ordered TRIE is given to the partition determination unit 3, and when the number of data groups is input from the group number input unit 31, the partition determination unit 3 determines the partitions of the concise ordered TRIE so that the sizes of data groups are as equal as possible.

When the determined partitions and the data D1, . . . , and D(n) are given to the data grouping unit 4, the data grouping unit 4 puts the data D1, . . . , and D(n) into the created concise ordered TRIE. Thereby, the data D1, . . . , and D(n) is grouped into as many data groups as the given number of data groups.

When the data groups as many as the given number of data groups are given to the grouped data sorter 5, the grouped data sorter 5 sorts each data group with a prescribed sorting method.

When the sorted data groups are given to the combiner 6, the combiner 6 combines the sorted data groups in a determined order, thereby creating sorted data.

The following describes a specific embodiment of this invention.

Figure 2:
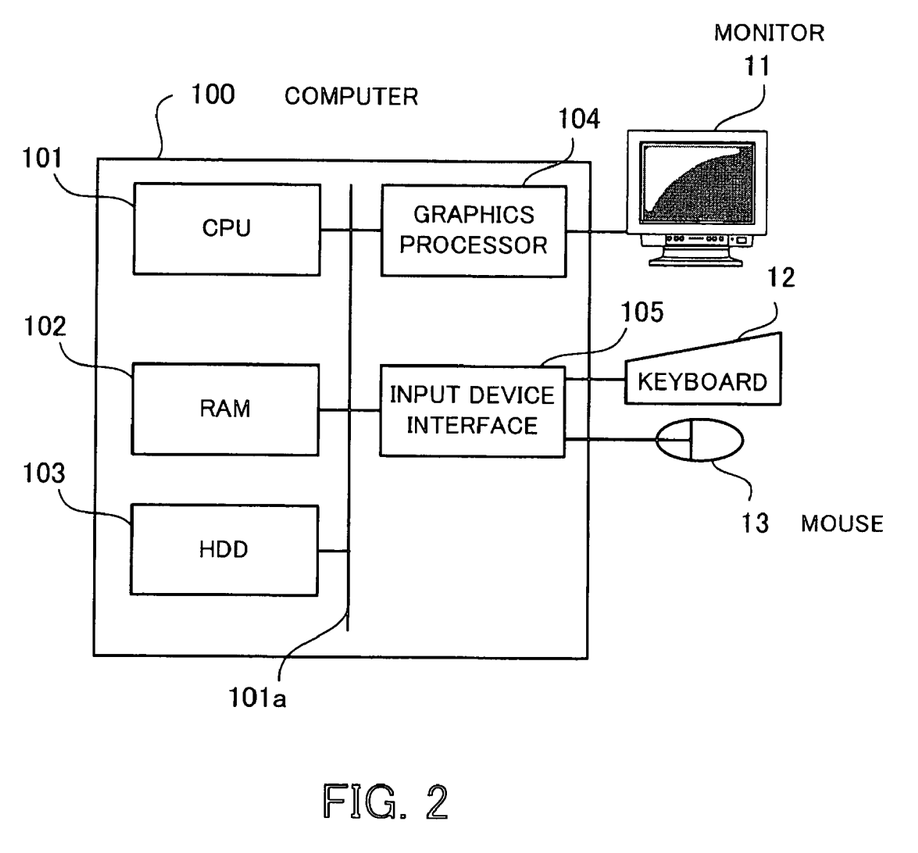
FIG. 2 shows an example hardware configuration of a computer according to the embodiment.

FIG. 2 shows the example hardware configuration of a computer of this embodiment. The program and method for data sorting according to this embodiment are realized by a data sorting processor 100 comprising a computer.

The data sorting processor 100 has the following hardware configuration.

The data sorting processor 100 is entirely controlled by a Central Processing Unit (CPU) 101. Connected to the CPU 101 via a bus 101a are a Random Access Memory (RAM) 102, a Hard Disk Drive (HDD) 103, a graphics processor 104, and an input device interface 105.

The RAM 102 temporarily stores at least part of an Operating System (OS) program and application programs that are executed by the CPU 101. In addition, the RAM 102 stores various kinds of data necessary for CPU processing. The HDD 103 stores the OS and application programs.

The graphics processor 104 is connected to a monitor 11, and is designed to display images on a screen of the monitor 11 under the control of the CPU 101. The input device interface 105 is connected to a keyboard 12 and a mouse 13, and is designed to transfer signals from the keyboard 12 and the mouse 13 to the CPU 101 via the bus 101a.

With such a hardware configuration, the processing functions of this embodiment can be realized.

The following describes about the data sorting process of the data sorting processor 100 having the configuration described with FIG. 2, according to the embodiment.

Figure 3:
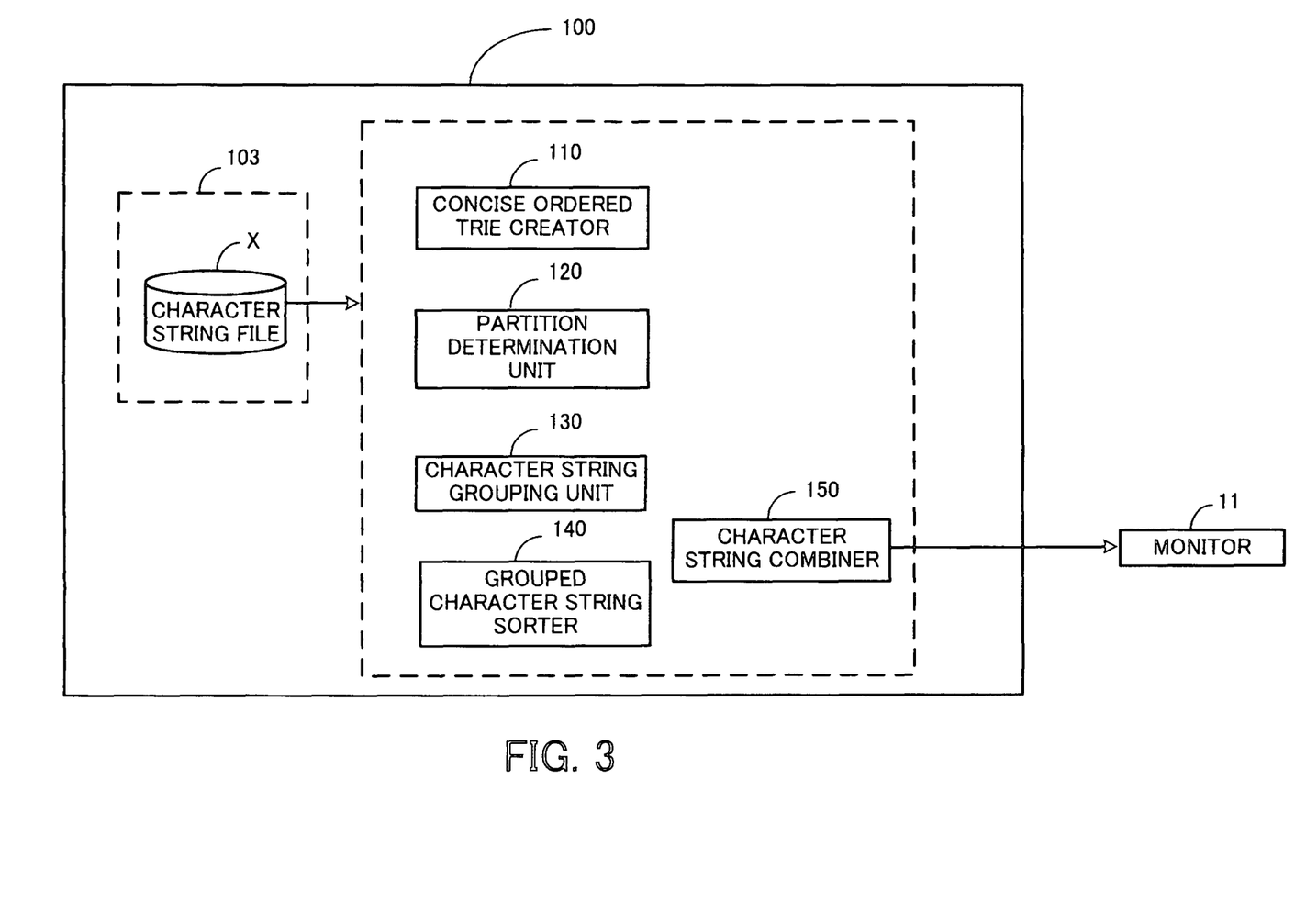
FIG. 3 is a functional block diagram of the computer.

FIG. 3 is a functional block diagram of a computer.

The HDD 103 stores a character string file X containing n character strings X1, X2, . . . , and X(n).

The data sorting processor 100 has the following processing functions that are realized by software: a concise ordered TRIE creator 110, a partition determination unit 120, a character string grouping unit 130, a grouped character string sorter 140, and a character string combiner 150.

The concise ordered TRIE creator 110 has a variable T representing a concise ordered TRIE currently created, a variable λ representing a character currently processed, and a variable v representing a node or a root currently controlled.

The concise ordered TRIE creator 110 has a function nextchar( ) that takes out a next character in a j-th ($1 \leq j \leq n$) character string X(j), a function goto(w, a) that returns a next node following a node w through a character (record) a, a function (no return value) make(w, a, z) that adds a node z to a concise ordered TRIE T so that the function goto(w, a)=z is satisfied and the node z is positioned at an ordered place with respect to the character a in the concise ordered TRIE T, and a function count(w) that returns the counter value of the node w.

For example, assume now that a j-th character string X(j) is "BE" and a current character is "B". The operation of the function nextchar( ) results in taking out a next character "E".

The concise ordered TRIE creator 110 reads the character strings X1, X2, . . . , and X(n), and creates a concise ordered TRIE T by using a growth parameter α entered through the keyboard 12 or the mouse 13 and the above-mentioned variables and functions.

The partition determination unit 120 has a function bucket (w) that returns a bucket ID assigned to a node w. When a concise ordered TRIE T is given from the concise ordered TRIE creator 110, the partition determination unit 120 determines partitions based on the number n of character strings and the number β of data groups entered through the keyboard 12 or the mouse 13. Specifically, the partition determination unit 120 creates a concise ordered TRIE T1 by adjusting the concise ordered TRIE T such that the number n of character strings are equally grouped (such that the amount of character string data is equally divided), divides the concise ordered TRIE T1 between determined nodes, and assigns a bucket ID to each grouped node with the function bucket(w). It should be noted that a method of assigning bucket IDs is not especially limited, provided that the method enables discriminating each grouped node.

The character string grouping unit 130 has a variable λ1 representing a current character and a variable v1 representing a current node or root.

In addition, the character string grouping unit 130 has the above-described functions nextchar( ) goto(w, a) and bucket (w).

The character string grouping unit 130 creates as many buckets B1, . . . , and B(m) as the number of bucket IDs assigned by the partition determination unit 120. Then by applying the character strings X1, X2, . . . , X(n) to the concise ordered TRIE T1, the character string grouping unit 130 puts the character strings X1, X2, . . . , and X(n) in corresponding buckets B1, . . . , and B(m) based on the bucket IDs.

Assume now that the groups of character strings stored in the buckets B1, . . . , and B(m) are taken as character string groups U1, . . . , and U(m). The grouped character string sorter 140 sorts each character string group U1, . . . , U(m) with a prescribed sorting method.

This sorting method is not especially limited, but there are a sorting method disclosed in Japanese Unexamined Patent Publication No. 2003-44267 and a quicksort method.

The character string combiner 150 combines the sorted character string groups U1a, . . . , and U(m)a in a determined order, and outputs the combined data to the monitor 11 as a sorting result.

The data sorting is performed by a computer having the configuration described above.

The following describes about the data sorting process by the data sorting processor 100 in detail.

Figure 4:
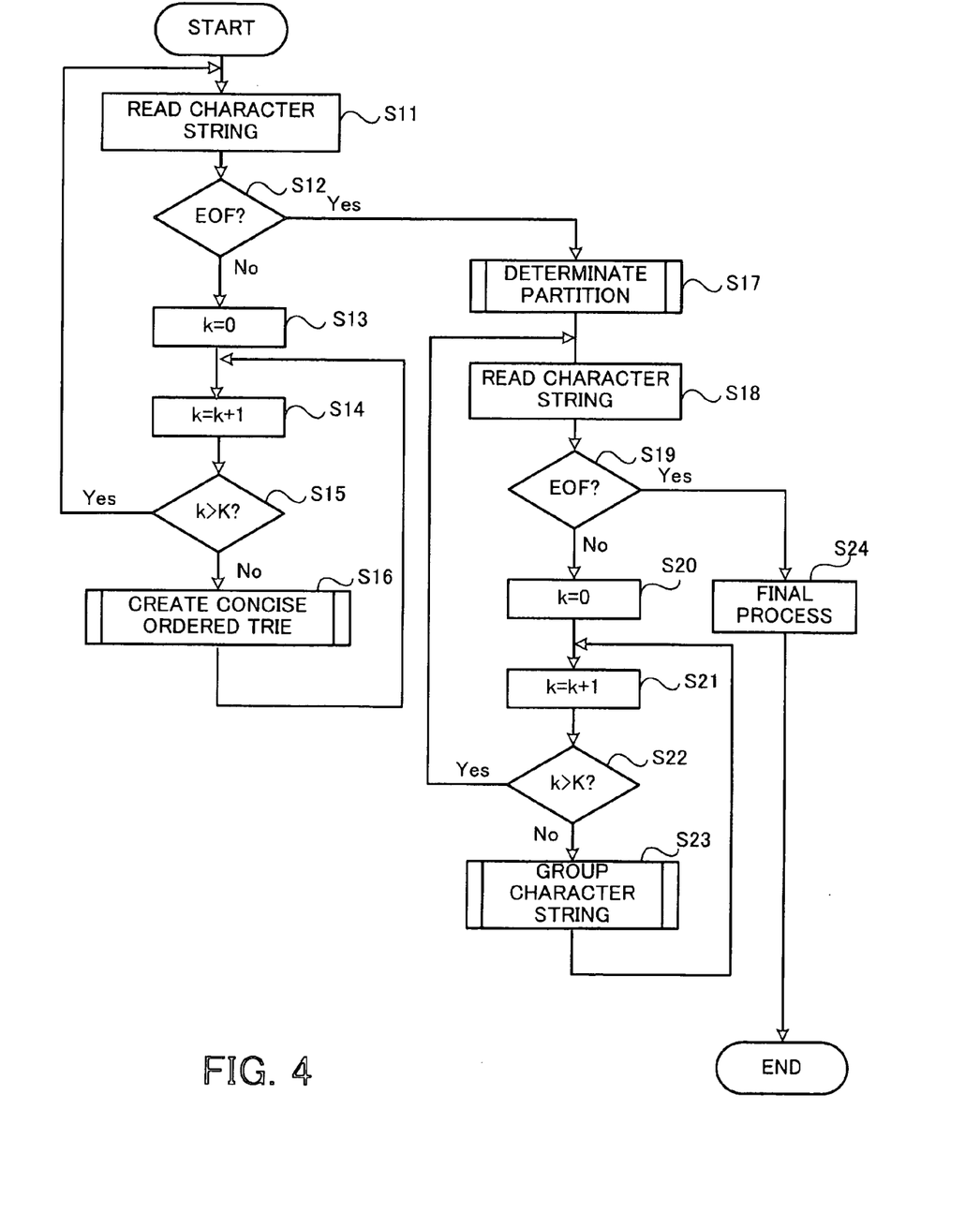
FIG. 4 is a flowchart of a data sorting process.

FIG. 4 is a flowchart showing a procedure of a data sorting process. Hereinafter, the steps shown in FIG. 4 will be described step by step.

First, the concise ordered TRIE creator 110 attempts to read an unread character string (step S11).

Then, the concise ordered TRIE creator 110 determines whether or not it has read all character strings X1, . . . , and Xn (step S12).

When all of the character strings have not been read (No at step S12), the concise ordered TRIE creator 110 obtains and reads the first appearing character string X(y) ($0 \leq y < n$) out of the unread character strings.

Then the concise ordered TRIE creator 110 sets a variable k to zero (step S13).

Then the concise ordered TRIE creator 110 increments the variable k (step S14).

Then the concise ordered TRIE creator 110 determines whether or not the variable k is larger than the number K of characters of the read character string X(y) (step S15).

When the variable k is larger than the number K of characters (Yes at step S15), the process goes back to step S11.

When the variable k is equal to or smaller than the number K of characters (No at step S15), on the contrary, a concise ordered TRIE T is created (step S16).

The subroutine of step S16 will be described in detail later.

On the other hand, when the reading of an unread character string at step S11 results in failure, that is, when the concise ordered TRIE creator 110 has read all of the character strings X1, . . . , and X(n) (Yes at step S12), the partition determination unit 120 determines partitions (step S17).

The subroutine of step S17 will be described in detail later.

Then, the character string grouping unit 130 attempts to read an unread character string (step S18).

Then the character string grouping unit 130 determines whether or not it has read all of the character strings X1, . . . , and X(n) of the character string file X (step S19).

When all of the character strings X1, . . . , and X(n) have not been read (No at step 19), the character string grouping unit 130 obtains the first appearing character string X(y) out of the unread character strings X1, X(n), and reads the first character of the character string X(y).

Then the character string grouping unit 130 sets the variable k to zero (step S20).

Then the character string grouping unit 130 increments the variable k (step S21).

Then the character string grouping unit 130 determines whether or not the variable k is larger than the number K of characters of the read character string X(y) (step S22).

When the variable k is larger than the number K of characters (Yes at step S22), the process goes back to step S18.

When the variable k is equal to or smaller than the number K of characters (No at step S22), the character string is grouped (step S23).

The subroutine of step S23 will be described in detail later.

On the other hand, when the reading of an unread character string at step S18 results in failure, that is, when all of the character strings X1, . . . , and X(n) have been read (Yes at step S19), the final process is executed (step S24). Specifically, as described before, with respect to the created character string groups U1, and U(m), the grouped character string sorter 140 sorts each of the character string groups U1, . . . , and U(m), and the character string combiner 150 combines the sorted character string groups U1a, . . . , and U(m)a in this order (in a determined order) and outputs the combined data to the monitor 11 as a sorting result. Then the data sorting process is completed.

Figure 5:
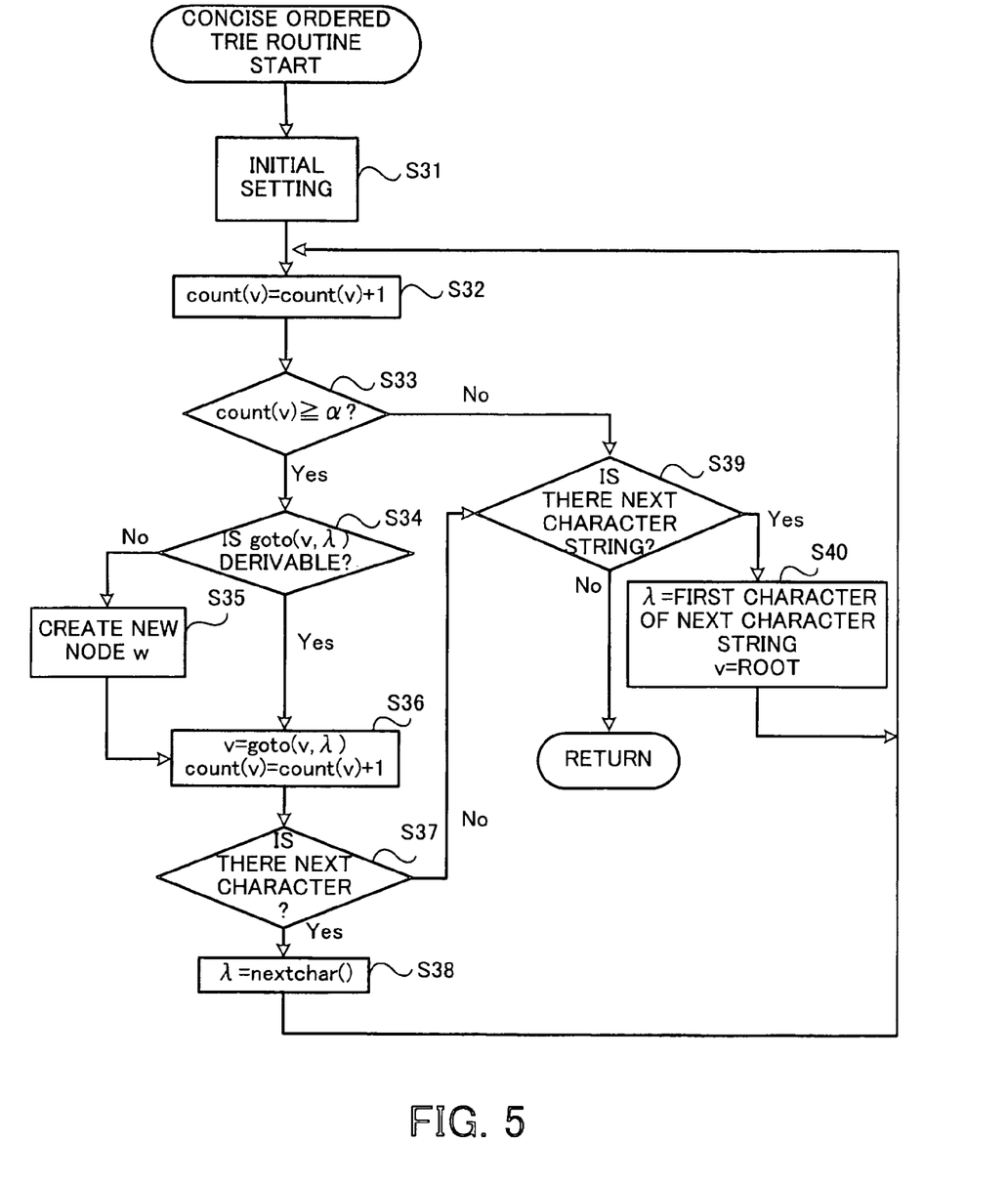
FIG. 5 is a flowchart of a concise ordered TRIE routine.

Now, the concise ordered TRIE routine will be described.

FIG. 5 is a flowchart of a concise ordered TRIE routine.

The steps shown in FIG. 5 will be described step by step.

It should be noted that the concise ordered TRIE routine is mostly executed by the concise ordered TRIE creator 110 unless otherwise stated.

First, the initial setting is performed (step S31). Specifically, a variable v is set to a root, a variable T is set to a TRIE comprising the root v only, a variable λ is set to the first character of the character string X1, and a function count(v)= 0 is set.

Then, the counter value of the root (node) set as the variable v is incremented (step S32).

Then it is determined whether or not the counter value of the root (node) set as the variable v is equal to or larger than a growth parameter α (step S33).

When the counter value is lower than the growth parameter α (No at step S33), the process goes to step S39.

When the counter value is equal to or larger than the growth parameter α (Yes at step S33), on the contrary, it is then determined whether the function goto(v, λ) is derivable, that is, whether there is a next node (child node) to which the current data follows from the root (parent node) set as the variable v (step S34).

When the function goto(v, λ) is derivable (Yes at step S34), the process goes to step S36. When the function goto(v, λ) is not derivable (No at step S34), on the contrary, the function make(v, λ, w) is executed to create a new node w, and then the function count(w)=0 is set (step S35).

Then, the function goto(v, λ) is executed to take a resultant node as a next node v to be processed (to be controlled) next, and the counter value of the next node set as the variable v is incremented (step S36).

Then, it is confirmed whether or not there is a next character in the current character string X(j), that is, whether or not there remains any characters in the current character string X(j) that should be subjected to the concise ordered TRIE routine (step S37).

When there is a next character (Yes at step S37) the next character in the current character string X(j) is taken out (step S38), and the process goes back to step S32.

When there is no next character (No at step S37) on the other hand, then it is determined whether or not there is a next character string X(j+1) (step S39).

When there is a next character string X(j+1) (Yes at step S39), the variable X is set to the first character of the next character string X(j+1) and the variable v is set to the root, and then the process goes back to step S32 (step S40).

When there is no next character string X(j+1) (No at step S39), on the contrary, the concise ordered TRIE routine is completed.

Figure 6:
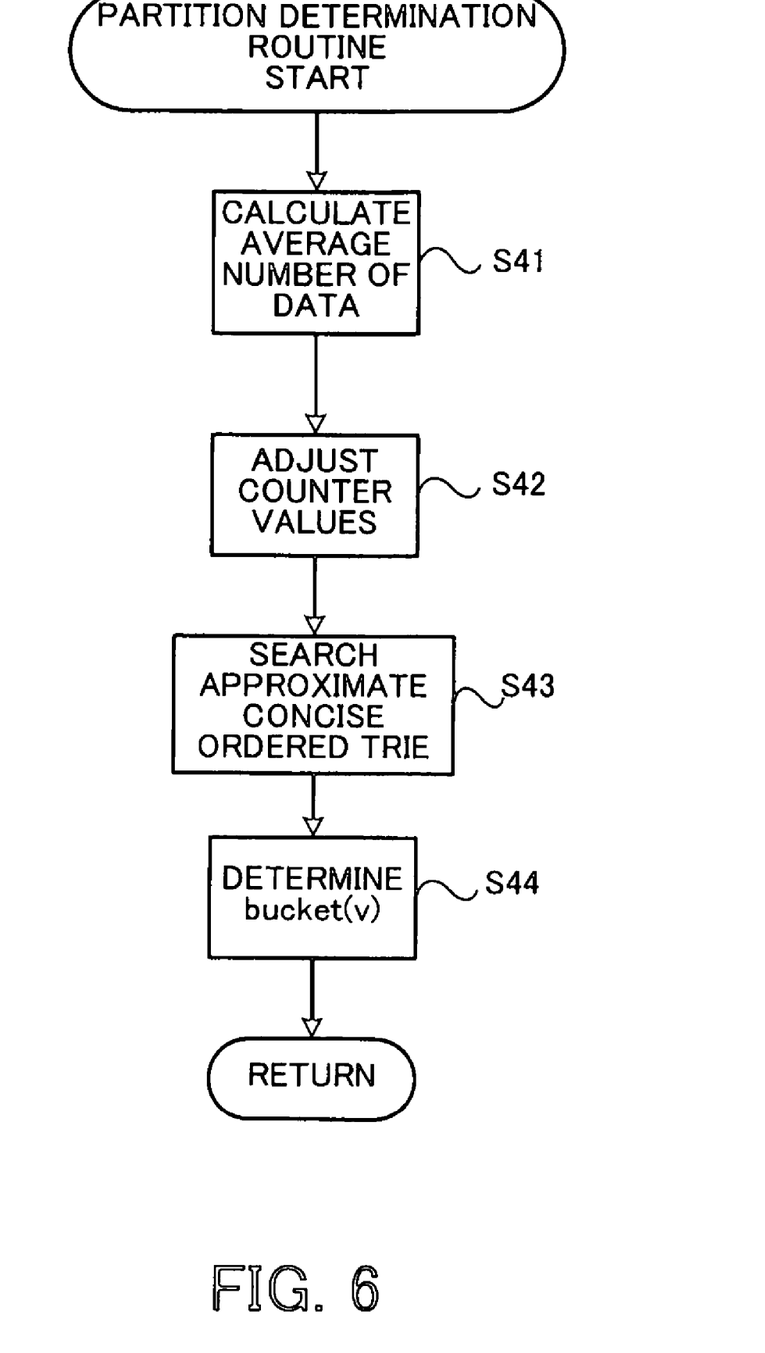
FIG. 6 is a flowchart of a partition determination routine.

Now, the partition determination routine will be described.

FIG. 6 is a flowchart of a partition determination routine.

The steps shown in FIG. 6 will be described step by step.

The partition determination routine is mostly executed by the partition determination unit 120 unless otherwise stated.

The average number $D_{AVE}$ of data to be put in each bucket B1, . . . , B(n) is calculated (step S41). Specifically, the average number $D_{AVE}$ of data is calculated by dividing the number n of character strings X1, . . . , and X(n) by the given number β of character groups.

Then, it is confirmed whether or not the sum of counter values of child nodes is equal to the counter value of a parent node in the concise ordered TRIE T. When the sum of the counter values of the child nodes is not equal to the counter value of the parent node, the counter values of the child nodes are adjusted based on a ratio of the counter values of the child nodes so that the sum of the counter values of the child nodes becomes equal to the counter value of the parent node, thereby creating an approximate concise ordered TRIE T1 (step S42).

Then, the counter values of nodes are successively added for each depth or width of the concise ordered TRIE T1, and the node that realizes that the sum is approximately equal to the average number $D_{AVE}$ of data is taken as a partition (step S43).

Then, the concise ordered TRIE T1 is searched to determine the function bucket(v) that shows an ID of a node set as a variable v, the ID changing before and after the node set as a partition (step S44).

Then, the partition determination routine is completed.

The adjustment of counter values at step S42 may be performed at the former stage of the partition determination routine.

Figure 7:
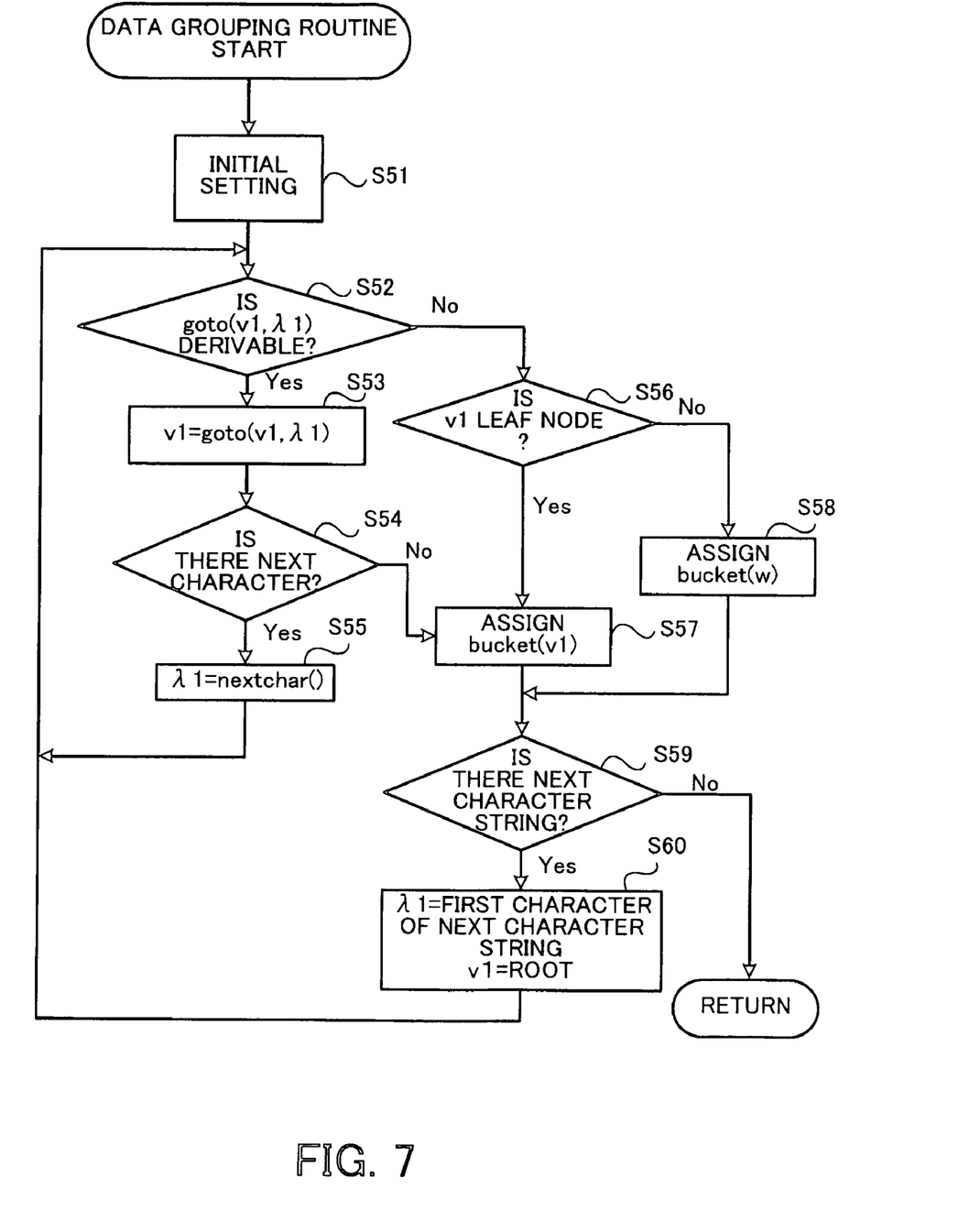
FIG. 7 is a flowchart of a data grouping routine.

Now the data grouping routine will be described.

FIG. 7 is a flowchart of a data grouping routine.

The steps shown in FIG. 7 are described step by step.

The data grouping routine is mostly executed by the character string grouping unit 130 unless otherwise stated.

First the initial setting is performed (step S51). Specifically, the variable λ1 is set to the first character of a character string X1, and the variable v1 is set to the root of the approximate concise ordered TRIE T1.

Then, it is determined whether or not the function goto(v1, λ1) is derivable (step S52).

When the function goto(v1, λ1) is derivable (Yes at step S52), the function goto(v1, λ1) is executed with respect to the variable v1 (step S53).

Then, it is determined whether or not there is a next character in the current character string X(j) (step S54).

When there is a next character (Yes at step S54) the next character in the current character string X(j) is set as the variable λ1 (step S55), and the process goes back to step S52.

When there is no next character (No at step S54) on the contrary, the process goes to step S57.

When the function goto(v1, λ1) is not derivable at step S52 (No at step S52), then it is determined whether or not the node set as the variable v1 is a leaf node (step S56).

When the node set as the variable v1 is a leaf node (Yes at step S56), the function bucket(v1) is assigned to the current character string X(j) (step S57), and the process goes to step S59.

When the node set as the variable v1 is not a leaf node (No at step S56), on the contrary, the bucket(w) regarding the node w that is the closest to a leaf node in the current character string X(j) in the concise ordered TRIE T1 is assigned to the current character string X(j) (step S58), and the process goes to step S59.

Then, it is determined whether or not there is a next character string X(j+1) (step S59).

When there is the next character string X(j+1) (Yes at step S59), the variable λ1 is set to the first character of the next character string X(j+1), the variable v1 is set to the root (step S60), and then the process goes back to step S52.

When there is no next character string X(j+1) (No at step S59), the data grouping routine is completed.

FIGS. 8 to 11 are conceptual views specifically showing the data sorting process.

Figure 8:
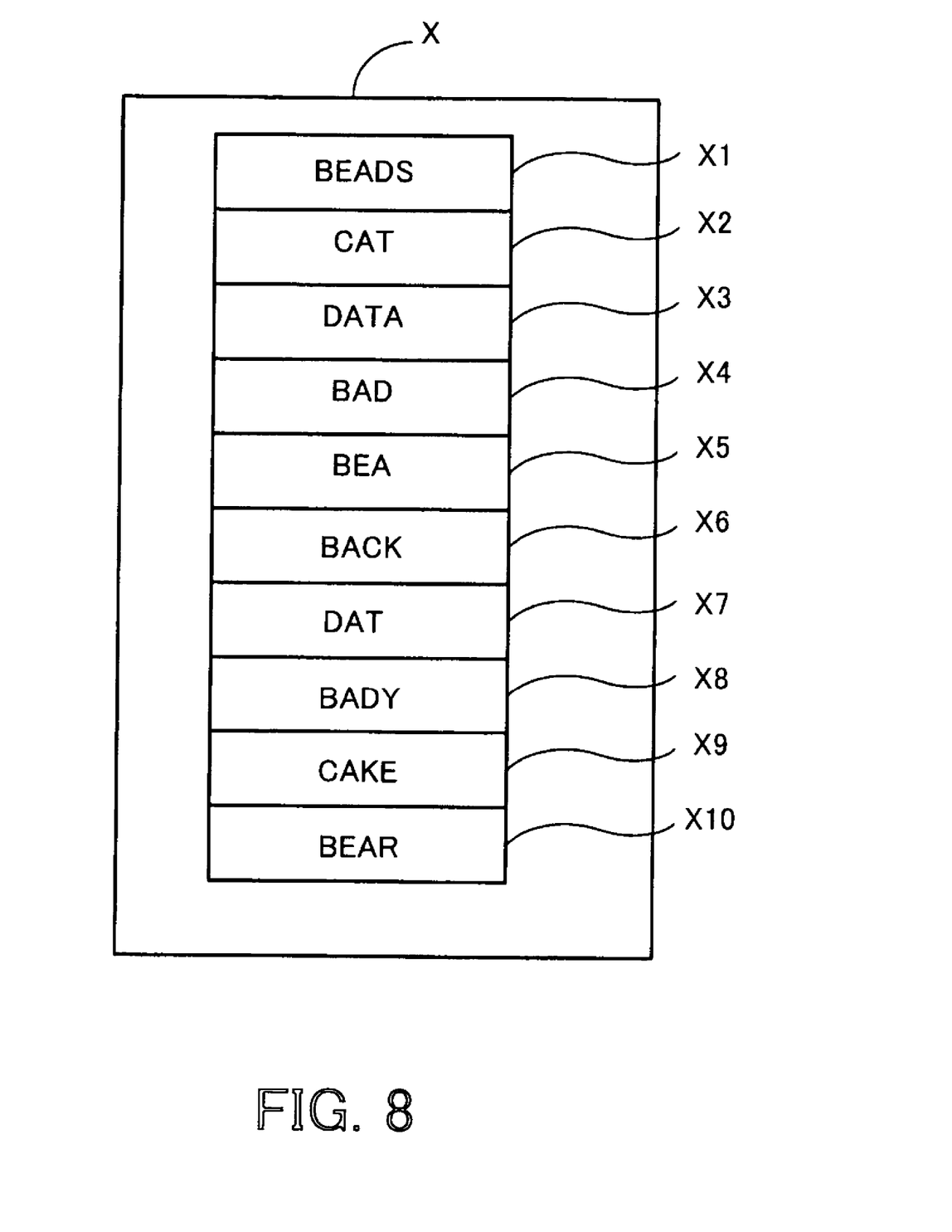
FIG. 8 shows a character string file.

FIG. 8 shows a character string file.

As shown in FIG. 8, ten character strings X1, . . . , X10=<BEADS, CAT, DATA, BAD, BEA, BACK, DAT, BADY, CAKE, BEAR> are stored in this order from above in the character string file X.

Now, the data sorting process of the character string file X will be described.

Figure 9:
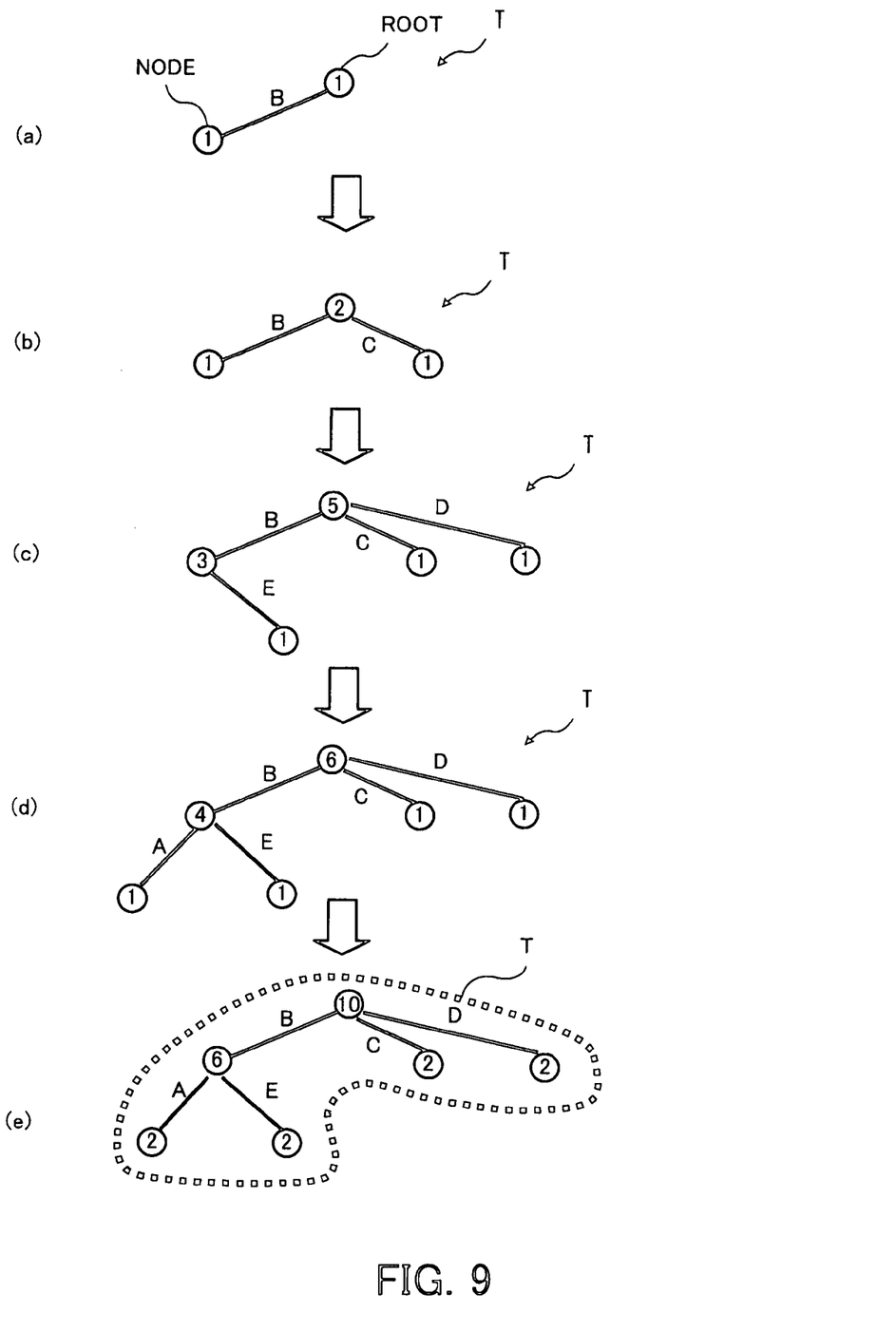
FIG. 9 is a conceptual view showing how to create a concise ordered TRIE.

FIG. 9 is a conceptual view showing a process to create a concise ordered TRIE.

In this connection, the right side and the left side on the sheet of FIG. 9 are called "right" and "left", respectively.

In addition, it is assumed that a growth parameter α=3 and the number of character groups β=3.

First, the concise ordered TRIE creator 110 obtains the first character string "BEADS" of the character string file X.

As shown in FIG. 9(a), the concise ordered TRIE creator 110 sets the counter of the root of the concise ordered TRIE T to one. Since the TRIE has this root only at this time, the concise ordered TRIE creator 110 creates a new node corresponding to the first character "B". The counter value of this node is set to one. Then the second character string "CAT" is obtained. As shown in FIG. 9(b), the counter value of the root is incremented, a node corresponding to the character "C" is created, and the counter value of this node is set to one. With respect to the third character string "DATA", the same process is performed, thereby creating a node corresponding to a character "D". In this connection, the node corresponding to "C" has been created on the right side of the first character "B". Therefore, the node corresponding to the character "D" is created on the right side of the character "C" so that these alphabets have a consistent directionality (A, B, . . . , Y, Z).

By the time when the fourth character string "BAD" is read, the node corresponding to the character "B" has been created by reading the first character string "BEADS". Therefore, the attention is moved down to the node of the character "B", and the counter value of the node (current node) of this character "B" (hereinafter, referred to as the counter value of the node "B") is incremented. As a result, the counter value of the node "B" becomes 2.

Then, when the fifth character string "BEA" is read, the counter value of the node "B" is incremented. As a result, the counter value of the node "B" becomes 3 which is equal to the growth parameter α, so that, as shown in FIG. 9(c), a new node for the second character "E" of the current character string "BEA" is created, the attention is moved down to the node of the character "E", and the counter value of this node "E" is set to one.

Then, when the sixth character string "BACK" is read, the counter value of the node "B" is incremented. As a result, the counter value of the node "B" becomes 4 which is equal to or larger than the growth parameter α. Therefore, as shown in FIG. 9(d), a new node for the second character "A" of the current character string "BACK" is created, the attention is moved down to the node of the character "A", and the counter value of this node "A" is set to one.

By repeating the above processes until the final character string "BEAR", the final concise ordered TRIE T is created as shown in FIG. 9(e).

Then, partitions for input data are determined by using the created concise ordered TRIE T.

Figure 10:
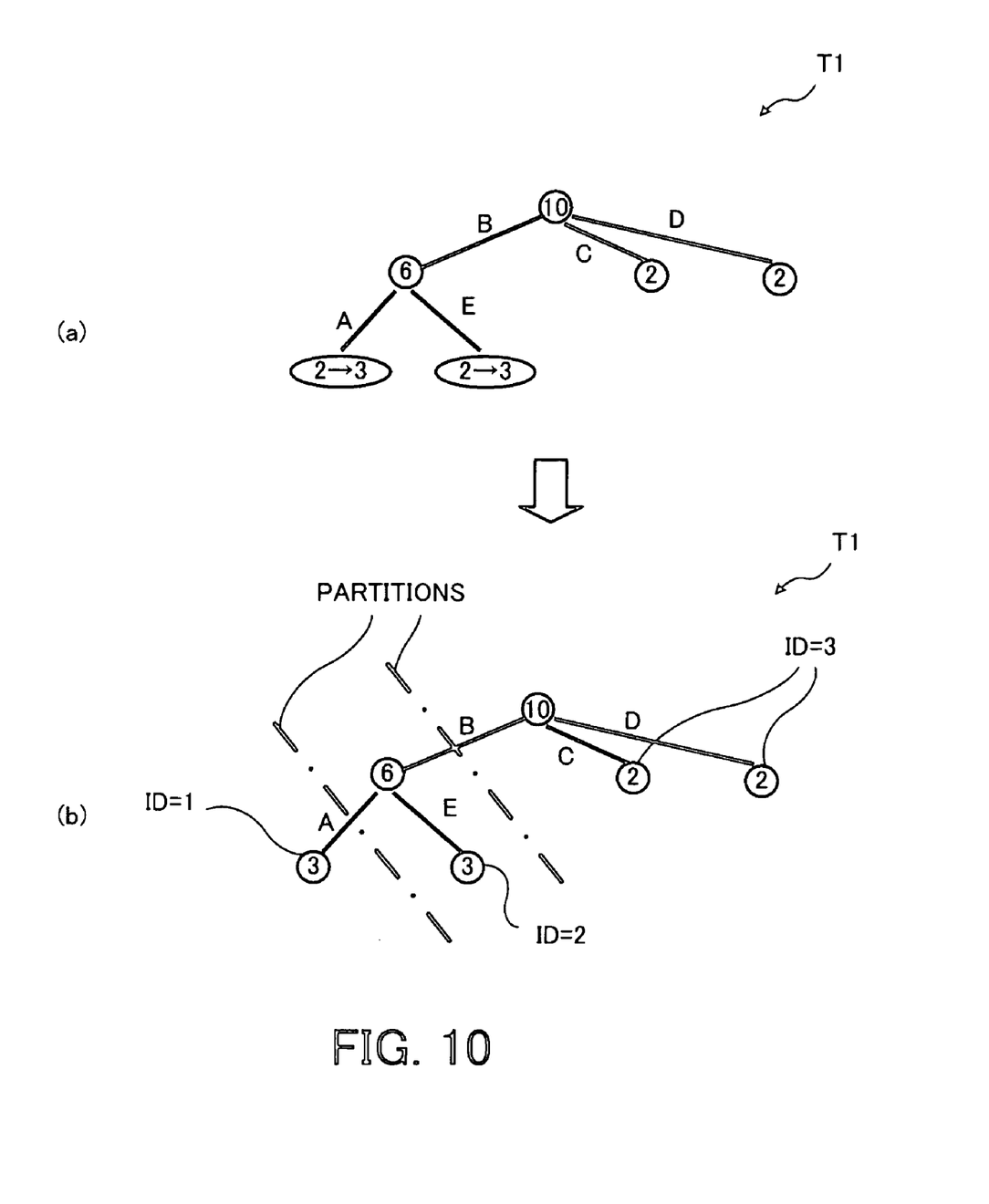
FIG. 10 is a conceptual view showing data partitions by using a concise ordered TRIE.

FIG. 10 is a conceptual view showing data partitions by using a concise ordered TRIE.

The partition determination unit 120 calculates N/β= 3.333 . . . that is an operation of the number of data groups β=3 and the number of input data N=10.

Then, as shown in FIG. 10(a), in order to adjust the counter value 2 of the node of character "A", the counter value 2 of the node of character "E", and the counter value 6 of the node of character "B", one is added to each of the counter values of the nodes of characters "A" and "E" according to a ratio (1:1) of the counter values of the nodes of characters "A" and "E", thereby creating an approximate concise ordered TRIE T1.

Then, the partition determination unit 120 determines partitions by adjusting a combination of counter values based on operation results so that the value of one node or the total value of nodes in the concise ordered TRIE T1 becomes 3 or 4.

In this example, the counter values of the lowest child nodes of the concise ordered TRIE T1, that is, a combination of counter values of the nodes of characters "A", "E", "C", and "D" is adjusted.

In more detail, since the sum of the counter values of the nodes of characters "C" and "D" is 2+2=4, it is determined that partitions should exist between the node of character "A" and the node of character "E" and between the node of character "B" and the nodes of character "C" and character "D". The partitions are drawn between them, and ID=1 is given to the node of character "A", ID=2 is given to the node of character "E", and ID=3 is given to the nodes of characters "C" and "D".

Since the child nodes of a certain parent node in the concise ordered TRIE T1 has a consistent directionality, ID numbers to be assigned have the consistent directionality as well. That is to say, ID numbers increases in the same direction as alphabetical order (A to Z direction).

Then, the character string grouping unit 130 scans and applies the character strings X1, . . . , and X10 to the concise ordered TRIE T1 again, to thereby group the character strings X1, . . . , and X10 into three (β) buckets.

Figure 11:
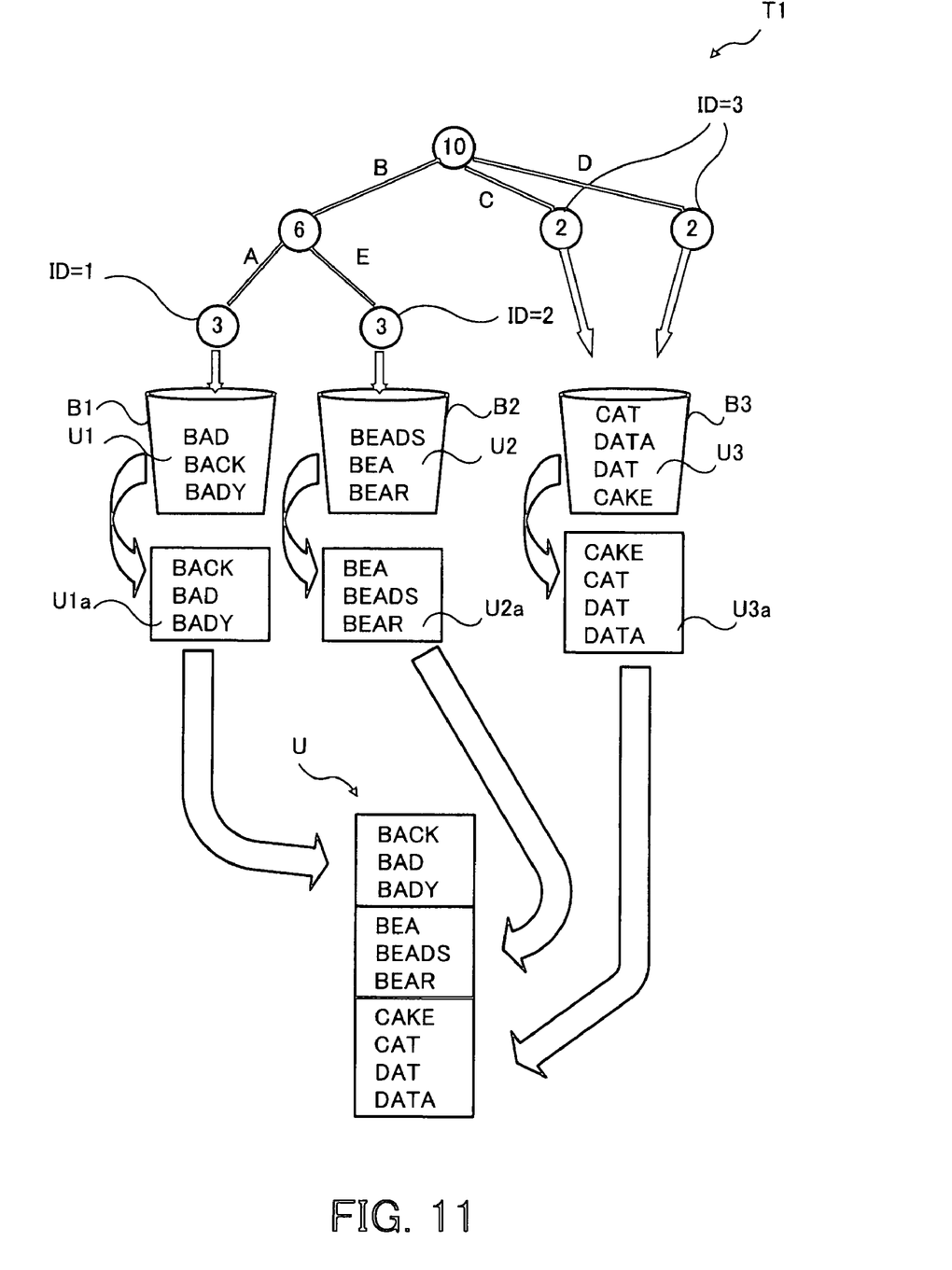
FIG. 11 is a conceptual view showing data grouping by using a concise ordered TRIE.

FIG. 11 is a conceptual view showing data grouping by using a concise ordered TRIE.

First, the first data "BEADS" is obtained and the concise ordered TRIE T1 is walked down for "BEADS". After the nodes are moved down for "BE", no further node exists. Therefore, the ID of the node "E", which was given at the partition determination stage, is referenced. ID=2 is detected, so that the data "BEADS" is put in the second bucket B2. Then, the second data "CAT" is obtained. The concise ordered TRIE T1 is walked down similarly. No further node exists next to the first character "C". Since this node has ID=3, the data "CAT" is put in the third bucket B3. The same process is repeated hereafter. As a result, ten character strings X1, . . . , X10=<BEADS, CAT, DATA, BAD, BEA, BACK, DAT, BADY, CAKE, BEAR> are grouped into three as follows. Bucket B1: character string group U1=<BAD, BACK, BADY>, bucket B2: character string group U2=<BEADS, BEA, BEAR>, bucket B3: character string group U3=<CAT, DATA, DAT, CAKE>.

Further, the character string groups U1, U2, and U3 in the buckets B1, B2, and B3 are individually sorted with an existing sorting method. The sorting of the sorted character string groups U1a, U2a, and U3a results in three character string group U1a=<BACK, BAD, BADY>, character string group U2a=<BEA, BEADS, BEAR>, and character string group U3a=<CAKE, CAT, DAT, DATA> that have a consistent directionality from U1a to U3a.

Then, the character string groups U1, U2a, and U3a are combined in this order, thereby obtaining U=<BACK, BAD, BADY, BEA, BEADS, BEAR, CAKE, CAT, DAT, DATA> that is the sorting result of the character strings X1, X10=<BEADS, CAT, DATA, BAD, BEA, BACK, DAT, BADY, CAKE, BEAR>.

As described above, the data sorting processor 100 is capable of creating a concise ordered TRIE T having a simple structure, without loosing information of important data portions, thus making is possible to reduce memory consumption (RAM 102) and simplifying the data sorting process.

Further, the character string groups U1, U2, and U3 are put in the corresponding buckets B1, B2, and B3, each bucket is sorted with a prescribed sorting method, the sorted character string groups U1a, U2a, and U3a are combined in a determined order, thereby completing the data sorting process without merging the once-grouped character string groups U1, U2a and U3a again. Thus, the data sorting process can be further simplified. Furthermore, the number of buckets B1, ..., B(m) is adjusted according to the capacity of a given RAM 102, so that the amount of data to be put in each bucket can be adjusted. Especially, the number of buckets B1, ..., and B(m) is adjusted so as to have a same amount of data, thus making it possible to easily prevent creation of buckets exceeding the capacity of memory. Even if the amount of character strings X1, ..., and X(n) to be processed is large in the sorting process of buckets B1, ..., and B(m), the data sorting process can be performed without accessing the HDD 103 again, thus making it possible to realize a faster data sorting process.

Furthermore, an approximate concise ordered TRIE T1 is created from the created concise ordered TRIE T, thus making it possible to realize a much faster process and reduce memory consumption.

The preferred embodiment of this invention has been described so far, but this invention should not be limited to the exact embodiment.

For example, character strings are used as sorting targets in the above description. However, numeric sequences may be used. In this case, zeros are attached to the beginning of a number so that all numbers in numerical sequences has the same digit number as a number having the largest digit number. In the case where a number having the largest digit number is "1111", for example, 61 is converted into "0061".

The processing functions described above can be realized by a computer. In this case, a data sorting program is prepared, which describes processes for the functions to be performed by the data sorting processor 100. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes (MT), etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, a concise ordered TRIE is created and the data sorting process is performed. Therefore, grouped data can be sorted without being merged again, thus making it possible to realize a simplified and faster data sorting process.

Further, data is grouped into a plurality of data groups, and each data group is sorted, thus making it possible to reduce memory consumption as compared with a case of directly sorting data.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium having stored therein a data sorting program for sorting a data file having a plurality of data, the data storing program causing a computer to operate as:
    a concise ordered Trie creator for creating a concise ordered Trie which is a tree structure by arranging, in a determined order, a plurality of nodes each representing a character of character strings of common prefixes which appears twice or more in the plurality of data;
    a partition determination unit for setting partitions between the nodes; and
    a data grouping unit for grouping the data file into a plurality of data groups according to the partitions, wherein:
        each node has an own counter that is incremented every time data passes through the each node; and
        in processing data having a number K ($K \geq 1$) of characters, when a counter of a node at a depth k ($1 \leq k \leq K$) from the root has a prescribed value or greater and there is no node corresponding to a character to be positioned at a depth (k+1), a node at the depth (k+1) is created from the node positioned at the depth k.

2. The computer-readable recording medium according to claim 1, wherein the concise ordered Trie creator creates a root, sequentially reads characters of each of the plurality of data, and when a prescribed number of data passed a node connected to the root before and a child node corresponding to a next character following a character associated with the node has not been created, creates the child node so that child nodes of the node have a prescribed arrangement.

3. The computer-readable recording medium according to claim 1, wherein the partition determination unit determines the partitions so that the plurality of data is equally grouped into the plurality of data groups.

4. The computer-readable recording medium according to claim 1, wherein:
    if there is another node at the depth (k+1) when the node at the depth (k+1) is created, the node at the depth (k+1) is created so that the another node at the depth (k+1) and the node at the depth (k+1) have a prescribed arrangement.

5. The computer-readable recording medium according to claim 4, wherein the partition determination unit sets the partitions based on counter values and a preset number of data groups.

6. The computer-readable recording medium according to claim 5, wherein the preset number of data groups is set so that an amount of each of the plurality of data groups is smaller than a capacity of a non-volatile memory of the computer.

7. The computer-readable recording medium according to claim 1, causing the computer to further operate as a data group sorter for sorting each of the plurality of data groups with a prescribed method.

8. The computer-readable recording medium according to claim 7, causing the computer to further operate as a combiner for combining the plurality of data groups sorted with the prescribed method, in a determined order.

9. The computer-readable recording medium according to claim 1, wherein, if a sum of counter values of i-th nodes is different from a counter value of an (i−1)-th node, the partition determination unit adjusts the counter values of the i-th nodes so that the sum of the counter values of the i-th nodes becomes equal to the counter value of the (i−1)-th node.

10. The computer-readable recording medium according to claim 9, wherein the counter values of the i-th nodes are adjusted according to a ratio of the counter values of the i-th nodes.

11. A data sorting method for sorting a data file having a plurality of data, comprising the steps of:
    creating a concise ordered Trie which is a tree structure by arranging, in a determined order, a plurality of nodes each representing a character of character strings of common prefixes which appears twice or more in the plurality of data;
    setting partitions between nodes; and
    grouping the data file into a plurality of data groups according to the partitions, wherein
        each node has an own counter that is incremented every time data passes through the each node; and
        in processing data having a number K (K≧1) of characters, when a counter of a node at a depth k (1≦k≦K) from the root has a prescribed value or greater and there is no node corresponding to a character to be positioned at a depth (k+1), a node at the depth (k+1) is created from the node positioned at the depth k.

12. A data sorting apparatus for sorting a data file having a plurality of data, comprising:
    concise ordered Trie creator means for creating a concise ordered Trie which is a tree structure by arranging, in a determined order, a plurality of nodes each representing a character of character strings of common prefixes which appears twice or more in the plurality of data;
    partition determination means for setting partitions between nodes; and
    data grouping means for grouping the data file into a plurality of data groups according to the partitions, wherein:
        each node has an own counter that is incremented every time data passes through the each node; and
        in processing data having a number K (K≧1) of characters, when a counter of a node at a depth k (1≦k≦K) from the root has a prescribed value or greater and there is no node corresponding to a character to be positioned at a depth (k+1), a node at the depth (k+1) is created from the node positioned at the depth k.

* * * * *